(12) United States Patent
Kuo

(10) Patent No.: US 7,149,008 B2
(45) Date of Patent: Dec. 12, 2006

(54) STAGGER SENSOR AND METHOD FOR IMPROVING MODULATION TRANSFER FUNCTION

(76) Inventor: Shih-Zheng Kuo, No. 21, Alley 8, Lane 57, Yu-Hsi St., Yungho, Taipei Hsien (TW)

( * ) Notice: Subject to any disclaimer, the term of this patent is extended or adjusted under 35 U.S.C. 154(b) by 717 days.

(21) Appl. No.: 10/005,784

(22) Filed: Nov. 8, 2001

(65) Prior Publication Data

US 2003/0086132 A1   May 8, 2003

(51) Int. Cl.
*H04N 1/04* (2006.01)
*H01L 27/00* (2006.01)

(52) U.S. Cl. .................... 358/483; 358/474; 250/208.1

(58) Field of Classification Search ................. 358/483, 358/474; 382/312; 348/302; 250/208.1
See application file for complete search history.

(56) References Cited

U.S. PATENT DOCUMENTS 5,189,529 A * 2/1993 Ishiwata et al. ............. 358/451
6,009,214 A * 12/1999 Suggs ......................... 382/312
6,728,009 B1 * 4/2004 Hemmings et al. ......... 358/474

* cited by examiner

*Primary Examiner*—Jerome Grant
*Assistant Examiner*—Houshang Safaipour
(74) *Attorney, Agent, or Firm*—Berkeley Law & Technology Group LLC

(57) ABSTRACT

A stagger sensor and a method for improving modulation transfer function. The method of using the stagger sensor for improving modulation transfer function can be applied to scan an object. The stagger sensor includes a plurality of sensing modules. The method of increasing scanning resolution includes retrieving reference digital data and processing digital data of a computed pixel obtained from an object scanning operation.

8 Claims, 5 Drawing Sheets

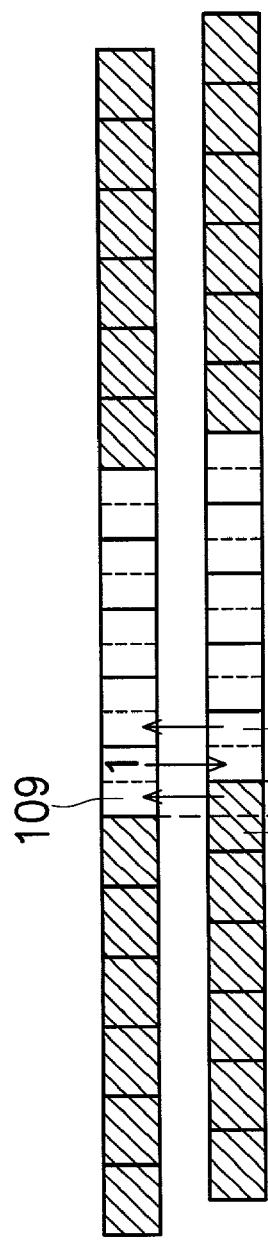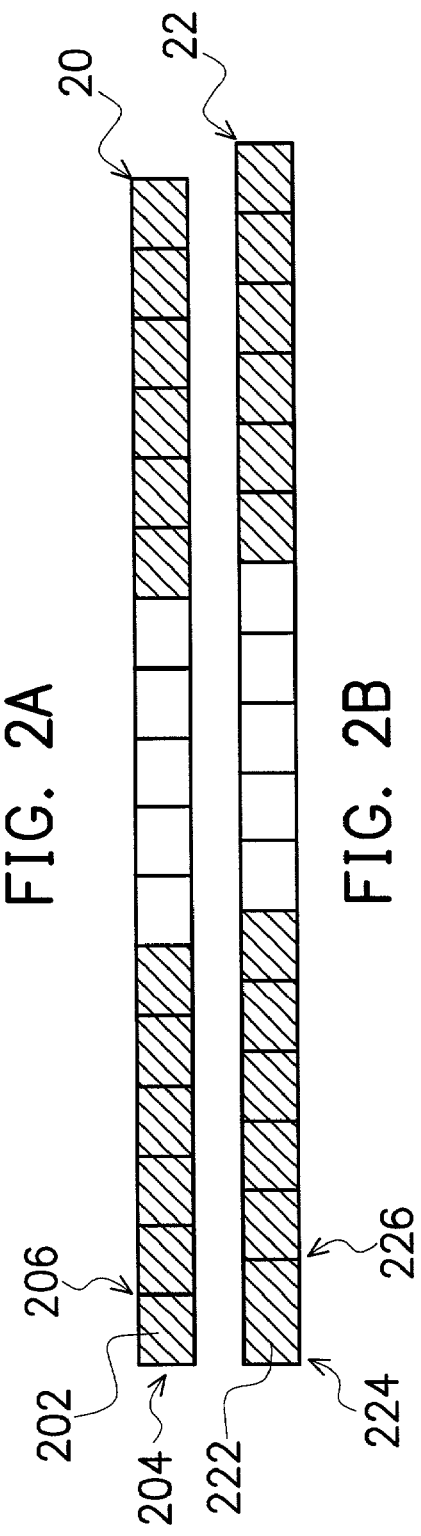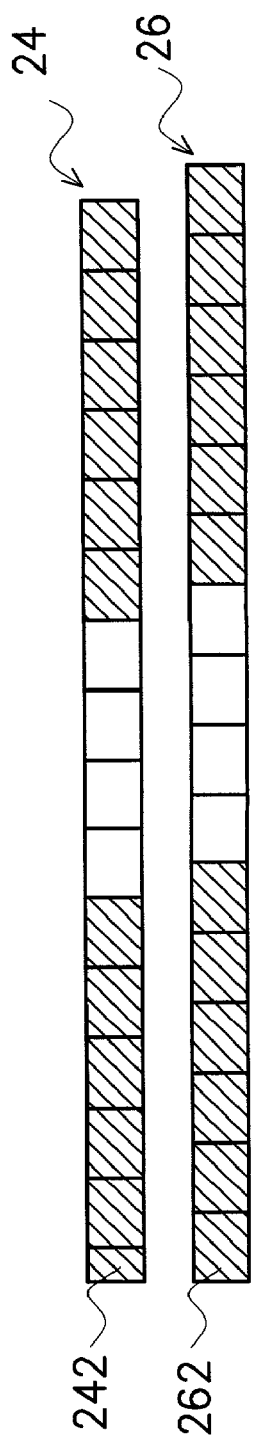

STAGGER SENSOR AND METHOD FOR IMPROVING MODULATION TRANSFER FUNCTION

BACKGROUND OF THE INVENTION

1. Field of Invention

The present invention relates to a stagger sensor and method for improving modulation transfer function. More particularly, the present invention relates to a stagger sensor and method for improving scanning resolution of a scanner.

2. Description of Related Art

Photocopiers, fax machines and scanners are common devices for capturing and converting images into electronic data for ease of printing, storage, transmission or image conversion. In general, optical sensors such as charge-coupled device (CCD) or contact image sensor (CIS) are used to extract image information. To capture a color image, the optical sensor normally consists of an array of CCD each capable of sensing at least the three primary colors red, green and blue. In a normal operation, all the CCD elements in the array are exposed to light for a predefined period. The amount of electric charge accumulated after the exposure is transferred to analogue shift registers for subsequent processing.

To enhance the resolution along the X-axis (long axis of the optical sensor), points are inserted along the X-axis so that data having an optical resolution greater than the optical sensor can be obtained. However, size of the cells within the optical sensor cannot be changed. Hence, brightness level data captured by the optical sensor during a scanning operation, if each sensing cell uses a resolution greater than the resolution of the optical sensor, is the average brightness level of several pixels. Therefore, using such a method to increase resolution may lower the performance of modulation transfer function (MTF).

SUMMARY OF THE INVENTION

Accordingly, one object of the present invention is to provide a stagger sensor for improving modulation transfer function. The stagger sensor has a plurality of parallel-positioned sensing modules along the long axis that corresponds to each sensed primary color. The most important characteristic of the stagger sensor is that the first light-sensing cells of a first sensing module and the second light-sensing cells of a second sensing module each has a first end at an identical perpendicular position along the long axis. However, the first light-sensing cell and the second light-sensing cell each has a second end in different perpendicular positions along the long axis.

This invention also provides a method for improving modulation transfer function using stagger sensors. The method utilizes a sensor having a plurality of staggered sensing modules inside for increasing scanning resolution along the X-axis. In addition, a special formula is also used to obtain a better modulation transfer function (MTF) value after the increase in pixel resolution. The method includes retrieving a group of reference digital data and using the reference digital data to process digital data derived from pixels in an object scanning operation.

The processing of subsequently captured digital data of computed pixels includes the following step. If the first light-sensing cell of the first sensing module contains reference digital data, digital data of the computed pixels scanned by the second light-sensing cell are:

$$A(X)=F(X)*N-A(X-1)-A(X-2)-\ldots-A(0)*(N-X);$$
and if the first light-sensing cell of the first sensing module does not contain any reference digital data, digital data of the computed pixels scanned by the second light-sensing cell are:

$$A(X)=F(X)*N-A(X-1)-A(X-2)-\ldots-A(X-N+1),$$
where

X is the desired computed pixel, N is the number of computed pixels included in a light-sensing cell, $A(X)$ is the digital data that correspond to the Xth computed pixel, $A(0)$ is the reference digital data, and $F(X)$ is the digital data obtained after a scanning operation that includes the computed pixels captured by the light-sensing cell.

This invention also provides an alternative method for improving modulation transfer function that uses a stagger sensor. The method is suitable for scanning an object. The stagger sensor used in the method is the aforementioned stagger sensor. The method for improving modulation transfer function using a stagger sensor includes the following steps. First, differences in a scanning region between a first light-sensing cell and a second light-sensing cell are utilized to obtain digital data of the first computed pixels. The digital data of the subsequent computed pixel captured through an object scanning operation are processed according to the digital data of the first computed pixel.

The processing of subsequently captured digital data of computed pixels includes the following step. If the second light-sensing cell and the first light-sensing cell in the forward scanning direction have some overlapping regions, the digital data of the computed pixel scanned by the second light-sensing cells and having no overlap with the first light-sensing cell are given by the formula:

$$A(X)=F(X)*N-A(X-1)-A(X-2)-\ldots-A(X-N+1),$$
where

X is the desired computed pixel, N is the number of computed pixels included in a light-sensing cell, $A(X)$ is the digital data that corresponds to the Xth computed pixel, $A(1)$ is the digital data of the first computed pixel, and $F(X)$ is the digital data obtained after a scanning operation that includes the computed pixels captured by the light-sensing cell.

In brief, this invention utilizes the intrinsic structural advantages of a stagger sensor to increase the resolution along the X-axis. In addition, the modulation transfer function of each pixel is increased through the provision of reference digital data. Furthermore, the stagger sensor is able to increase the scanning resolution along the X-axis as well as the modulation transfer function of each pixel even without the provision of reference digital data.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 2A is a diagram showing the deployment of a conventional stagger sensor for capturing data according to the reference digital data capturing method in FIG. 1;

FIG. 2B is a diagram showing the deployment of a stagger sensor according to this invention for capturing data according to a second reference digital data capturing method in FIG. 1;

FIG. 2C is a diagram showing the deployment of a stagger sensor according to this invention for capturing data according to a third reference digital data capturing method;

DESCRIPTION OF THE PREFERRED EMBODIMENTS

Figure 1:
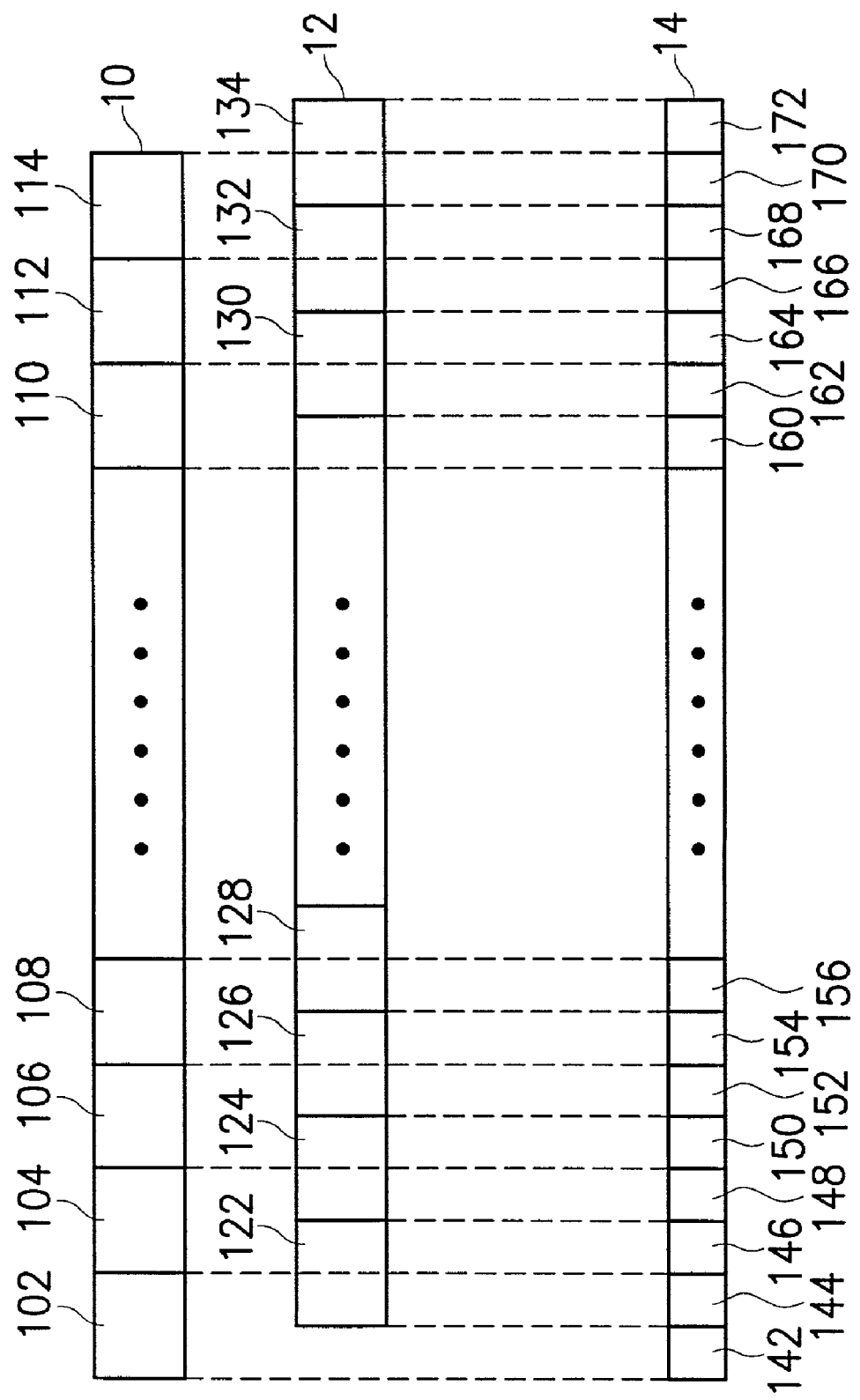
FIG. 1 is a diagram showing pixel positions according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram showing the relationship between pixel positions and the sensing cells within the stagger sensor according to one preferred embodiment of this invention. In this embodiment, the stagger sensor includes two groups of sensing modules 10 and 12 each having a multiple of light-sensing cells. The sensing module 10 includes light-sensing cells 102, 104, . . . , 114 while the sensing module 12 includes light-sensing cells 122, 124, . . . , 134. Due to a shift in position between the sensing module 10 and the sensing module 12 inside the stagger sensor, the portion of the scan object 14 captured by the light-sensing cells in the sensing module 10 does not overlap completely with the light-sensing cells in the sensing module 12. As shown in FIG. 1, the scan object 14 can be divided into pixels 142, 144, . . . , 172 according to the overlapping state of the light-sensing cells of the sensing module 10 and the sensing module 12, respectively.

Through the aforementioned operation, resolution of image is increased. However, the increase in image resolution often leads to a deterioration of modulation transfer function (MTF) of the pixels. Hence, it is essential to obtain a reference digital data (brightness value) and use that reference as a computational base to improve MTF.

FIG. 2A is a diagram showing the process of capturing reference digital data using a stagger sensor as a sensor in a scanner. In FIG. 2A, the arrangement of sensing modules for identical color inside a stagger sensor is shown. The shaded area indicates unused light-sensing cells in a scanning operation. In other words, one method of securing reference digital data in this invention is to use the digital data obtained from unused light-sensing cells.

Figure 3:
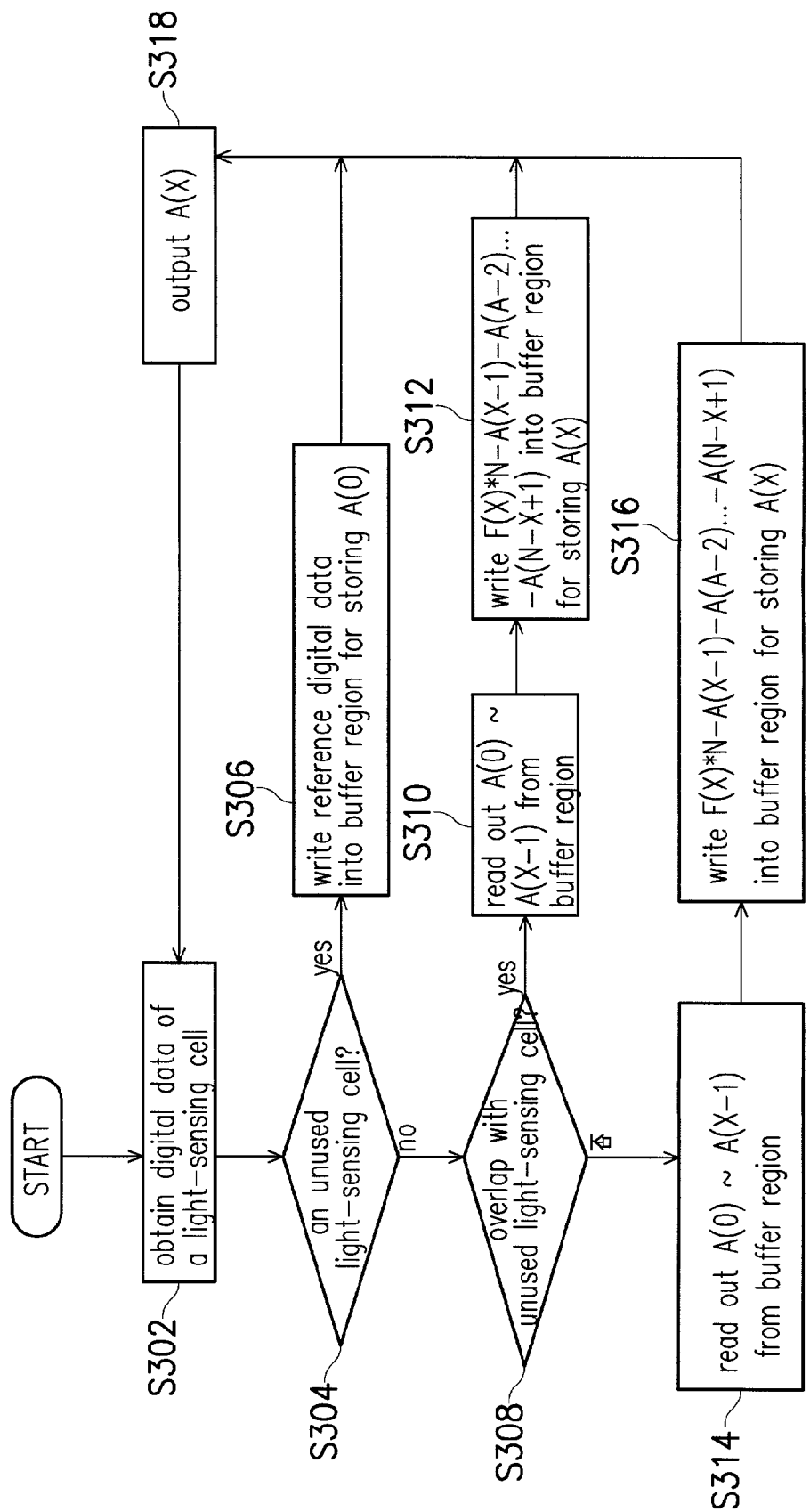
FIG. 3 is a flow chart showing the steps for capturing data using either a conventional stagger sensor or a stagger sensor according to this invention.

FIGS. 1, 2A and 3 together shows a method of using a stagger sensor to improve modulation transfer function according to one preferred embodiment of this invention. The method can be applied to scanning a scan object 14. The stagger sensor includes a first sensing module 10 and a second sensing module 12, both of which are used for scanning the same primary color.

The method of using the stagger sensor to improve modulation transfer function includes the following steps. In step S302, electric charges accumulated within a light-sensing cell are retrieved and then converted to digital data. In other words, brightness level of this light-sensing cell is determined. Here, the sensing range for a light-sensing cell is the number of computed pixels. In step S304, the light-sensing cell is checked to see if it is one of the unused light-sensing cells. If it is, this means that a copy of the digital data can be retrieved to serve as a reference base. In step s306, this reference digital data is written into a buffer region for storing A(0). After outputting this reference digital data (in step S318), the digital data of another light-sensing cell is retried again in step S302. In a subsequent step, digital data of subsequent computed pixel after scanning the scan object 14 is processed according to the reference digital data.

In this invention, a light-sensing cell may scan a multiple of computed pixels. Thus, the step of utilizing reference digital data for processing the digital data extracted from the computed pixel can be understood with reference to FIG. 2A.

In FIG. 2A, a number of light-sensing cells are unused (shaded areas). Hence, any one of the unused light-sensing cells may serve as a source for the reference digital data. When a used light-sensing cell (for example, the light-sensing cell 109) partially overlaps with an unused light-sensing cell (for example, the light-sensing cell 128) in the forward scanning direction, the used light-sensing cell and the unused light-sensing cell can have identical digital data within the overlapping region.

When the digital data of the overlapping region between the used light-sensing cell (the light-sensing cell 109) and the unused light-sensing cell (such as the light-sensing cell 128) are already known (in step S308), reference digital data are read out from the buffer region A(0) in step S310. In step S312, the following formula is used to find digital data of computed pixels scanned by the light-sensing cell 109, which has no overlapping region with the light-sensing cell 128: $A(X)=F(X)*N-A(X-1)-A(X-2) - \ldots -A(0)*(N-X)$. To simplify explanations, a light-sensing cell capable of scanning two pixels is used as an example. Hence, another portion of the light-sensing cell 109 can be obtained through the above formula. In other words, digital data of the scanned A(1) computed pixels are given by the formula: $A(1) F(1)*2-A(0)*(2-1)$.

When the retrieved light-sensing cell (in step S302) is not an unused light-sensing cell (in step S304) and also not having an overlapping region with any unused light-sensing cell (in step S308), previously calculated computed pixels are read from the buffer region in step S314. In step S316, the following formula is used to find the digital data of a computed pixel scanned by the light-sensing cell 129, which has no overlapping region with the light-sensing cell 109: $A(X)=F(X)*N-A(X-1)-A(X-2) - \ldots -A(X-N+1)$. In this embodiment, $A(2)=F(2)*2-A(2-1)$. Here, X is the desired computed pixel, N is the number of computed pixels includes in a light-sensing cell, A(X) is the digital data corresponding to the Xth computed pixel, A(0) is the reference digital data and F(X) is the digital data obtained after a scanning operation that includes the computed pixels captured by the light-sensing cell.

FIGS. 2B and 2C are schematic diagrams showing two methods for increasing scanning resolution by using a stagger sensor according to this invention. In FIG. 2B, the sensing module 20 and the sensing module 22 are positioned in parallel (for ease of explanation in subsequent paragraph, the parallel direction is referred to as the long axis). Furthermore, the light-sensing cell 202 within the sensing module 20 and the light-sensing cell 222 within the sensing module 22 have an identical position at a first end (204 and 224) along the long axis but a different position at a second end (206 and 226). Scanning resolution is increased when the stagger sensor according to this invention is used. However, after the increase in scanning resolution, the steps described in FIG. 3 may be required if improvement in the modulation transfer function (MTF) is also desired.

Consequently, no matter whether a conventional stagger sensor or the stagger sensor according to this invention is used, the captured reference digital data can be used to improve the MTF value after an improvement in scanning resolution.

In addition, using the stagger sensor of this invention, a comparison between the digital data obtained by scanning identical position using the light-sensing cell 202 and the light-sensing cell 204 can be made. Thus, digital data of pixel whose width is the difference in width between the light-sensing cell 202 and the light-sensing cell 204 can be obtained. Ultimately, scanning resolution of the scanner is increased. Moreover, if the structure described in the following paragraph is incorporated, MTF values are improved even without capturing any reference digital data.

In FIG. 2C, the operating principle of the sensing modules is identical to the ones in FIG. 2B. In fact, the structure shown in FIG. 2B and FIG. 2C are very similar. One major difference is that the light-sensing cell 242 within the light-sensing module 24 in FIG. 2C is smaller than other light-sensing cells of the light-sensing module 24. On the other hand, the light-sensing cell 222 within the light-sensing module 22 in FIG. 2B is larger than other light-sensing cells of the light-sensing module 22. However, these two types of structure operate identically. Both utilize the difference in the width of light-sensing cell (such as 202 and 222, or 242 and 262) to obtain digital pixel data having a width smaller than a conventional light-sensing cell. Using the digital data as a base to process other data captured by the light-sensing cells, better MTF values are obtained.

Figure 4A:
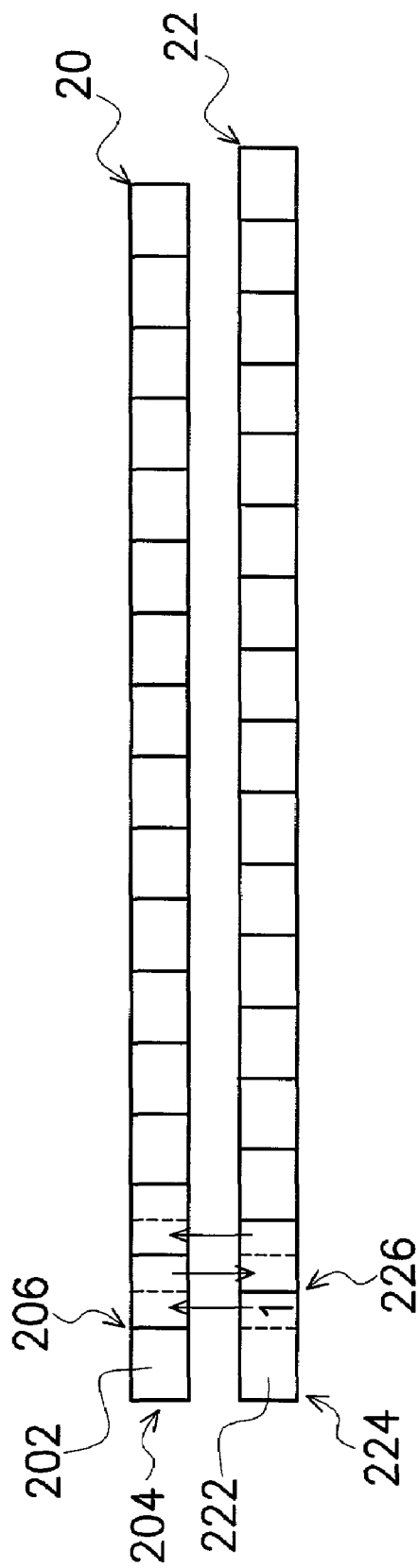
FIG. 4A is a diagram showing the deployment of a stagger sensor according to FIG. 2A without the need to obtain any reference digital data.
Figure 4B:
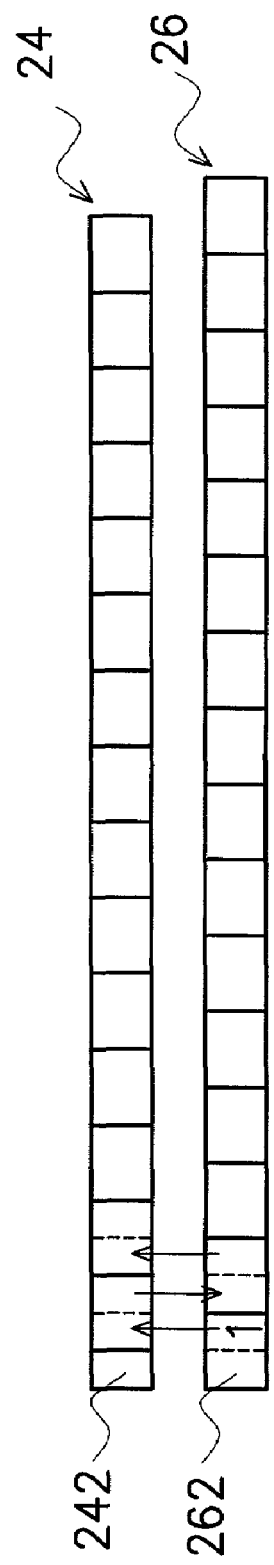
FIG. 4B is a diagram showing the deployment of a stagger sensor according to FIG. 2B without the need to obtain any reference digital data.
Figure 5:
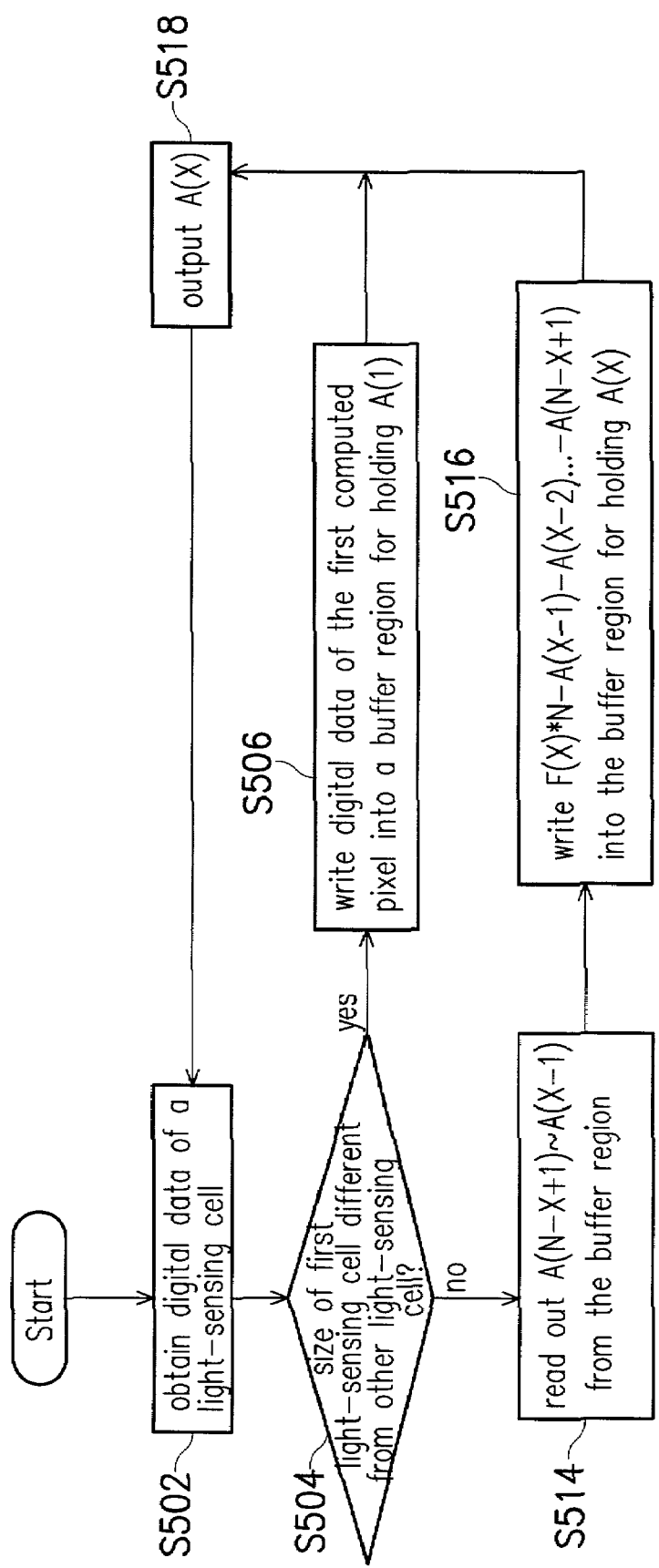
FIG. 5 is a flow chart showing the steps for capturing data using either the stagger sensor structure shown in FIG. 4A or 4B without the need to obtain any reference digital data.

FIGS. 4A, 4B and 5 together illustrate another preferred embodiment of this invention. The stagger sensor has a structure identical to the one in FIG. 2B. Similar, the stagger sensor in FIG. 4B has a structure identical to the one in FIG. 2C. Difference between FIGS. 4A and 2B on one hand and difference between FIGS. 4B and 2C on the other hand are in their methods of improving the MTF values.

As shown in FIG. 5, step S502 is executed. In step S502, electric charges accumulated within a light-sensing cell are retrieved and converted into a digital data. In other words, brightness level of this light-sensing cell is determined. Here, the sensing range for a light-sensing cell is the number of computed pixels. In step S504, the width of the light-sensing cell is checked to see if the width is different from that of other light-sensing cells (such as the light-sensing cell 222). If a difference in width is found, digital data having a pixel width smaller than a conventional light-sensing cell (such as the pixel digital data with the label 1) is obtained in step S506. The digital data is used as a base for processing digital data captured by other light-sensing cells.

If the newly retrieved light-sensing cell has a width identical to other light-sensing cells, step S514 is executed. In step S514, previously retrieved digital data of computed pixel are read from the buffer region (since the previously retrieved digital data of computed pixel is labeled 1, data read from the buffer region is A(1)). According to the formula in step S516, that is, $A(X)=F(X)*N-A(X-1)-A(X-2)-\ldots-A(X-N+1)$, digital data in the non-overlapping region and having a width greater than that of the light-sensing cell with partial overlapping is obtained. Hence, digital data A(X) for the $X^{th}$ pixel is found and transferred to the buffer region. In step S518, digital data A(X) is output and step S502 is again executed to obtain digital data of the next light-sensing cell.

The digital data in the overlapping region of the light-sensing cell having some overlapping region with another larger width light-sensing cell are labeled 1. In addition, the light-sensing cell having a width smaller than other light-sensing cells as shown in FIG. 4B can have a plurality of scanning spaces.

In conclusion, one major advantages of this invention is the full utilization of the advantages of a stagger sensor to increase scanning resolution along the X-axis. In addition, the MTF value of each pixel is increased whenever the stagger sensor is used together with a reference digital data. Furthermore, the stagger sensor of this invention alone is capable of increasing scanning resolution along the X-axis and the MTF value of most pixels even with no inclusion of any reference digital data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method, comprising:
    scanning an object using a stagger sensor;
    retrieving reference digital data; and
    calculating a computed pixel value using at least in part the retrieved reference digital data and data captured by the scanning operation,
    wherein scanning an object using a stagger sensor comprises scanning the object using a stagger sensor including a plurality of scanning modules, the plurality of scanning modules including a plurality of light-sensing cells, and
    wherein calculating a computed pixel value further includes: if a first light-sensing cell of a first sensing module includes a reference digital data and a second light-sensing cell of a second sensing module and the first light-sensing cell having some overlap in a forward scanning direction, digital data of a pixel in the region in the second light-sensing cell having substantially no overlap with the first light-sensing cell is obtained substantially in accordance with the following relationship:
    $A(x)=F(X)*N-A(X-1)-A(X-2)-\ldots-A(0)*(N-X)$ where X comprises a desired pixel, N comprises a number of pixels included in a light-sensing cell, A(X) comprises digital data corresponding to an $X^{th}$ pixel, A(1) comprises digital data of the first pixel, and F(X) comprises digital data captured during the scanning operation including pixels captured by the light-sensing cell.

2. The method of claim 1, wherein digital data in the overlapping region between the second light-sensing cell and the first light-sensing cell includes substantially identical digital data.

3. A method of improving modulation transfer function through scanning a scan object with a stagger sensor, wherein the stagger sensor includes a plurality of sensing modules, a first light-sensing cell of a first sensing module and a second light-sensing cell of a second sensing module having a first end on in substantially the same position along the axis wherein the first light-sensing cell has a second end in a different position along the axis than a second end of the second light-sensing cell, the method comprising:

obtaining digital data of a first pixel using a difference in scanning region between the first light-sensing cell and the second light-sensing cell; and processing digital data of a plurality of subsequent pixels after a scanning of the scan object according to the digital data of the first pixel.

4. The method of claim 3, wherein the first and second light-sensing cells are capable of scanning a plurality of pixels.

5. The method of claim 4, wherein processing digital data of subsequent pixels further includes: if the second light-sensing cell and the first light-sensing cell have an overlapping region in a forward scanning direction, digital data of the pixel scanned by the second light-sensing cell having substantially no overlapping with the first light-sensing cell are obtained substantially in accordance with the following relationship: $A(X) F(X)*N-A(X-1)-A(X-2)- \ldots -A(X-N+1)$ where X comprises a desired pixel, N comprises a number of pixels included in a light-sensing cell, $A(X)$ comprises digital data corresponding to an $X^{th}$ pixel, $A(1)$ comprises digital data of the first pixel, and $F(X)$ is digital data obtained by scanning using light-sensing cells.

6. The method of claim 5, wherein digital data in the overlapping region between the second light-sensing cell and the first light-sensing cell includes substantially identical digital data.

7. A method, comprising:
scanning an object using a stagger sensor;
retrieving reference digital data; and
calculating a computed pixel value using at least in part the retrieved reference digital data and data captured by the scanning operation, wherein scanning an object using a stagger sensor comprises scanning the object using a stagger sensor including a plurality of scanning modules, the plurality of scanning modules including a plurality of light-sensing cells, and wherein calculating a computed pixel value further includes: if a first light-sensing cell of a first sensing module includes no reference light-sensing cell of a second sensing module and the first light-sensing cell has some overlapping in a forward scanning direction, the digital data of the pixel scanned by the second light-sensing cell including substantially no overlap with the first light-sensing cell is obtained substantially in accordance with the following relationship:

$A(X)=F(X)*N-A(X-1)-A(X-2)- \ldots -A(X-N+1)$, where X comprises a desired pixel, N comprises a number of pixels included in a light-sensing cell, $A(X)$ comprises digital data corresponding to an $X^{th}$ pixel, $A(1)$ comprises digital data of the first pixel, and $F(X)$ comprises digital data captured during the scanning operation including pixels captured by the light-sensing cell.

8. An apparatus, comprising:
a scanner adapted to perform the method of claim 3 during operation.

* * * * *